(12) United States Patent
Miller et al.

(10) Patent No.: US 11,072,159 B2
(45) Date of Patent: Jul. 27, 2021

(54) METHODS FOR FABRICATING CUSTOM EYELASH PROSTHESES

(71) Applicant: L'Oreal, Paris (FR)

(72) Inventors: Zane Bowman Allen Miller, Redmond, WA (US); Mikhail Motornov, Clark, NJ (US); Christopher Pang, Clark, NJ (US); Kelly Marie George, Clark, NJ (US); Nadin Ahmed Gomez, Clark, NJ (US)

(73) Assignee: L'Oreal, Paris (FR)

( * ) Notice: Subject to any disclaimer, the term of this patent is extended or adjusted under 35 U.S.C. 154(b) by 13 days.

(21) Appl. No.: 16/818,957

(22) Filed: Mar. 13, 2020

(65) Prior Publication Data

US 2020/0214380 A1  Jul. 9, 2020

Related U.S. Application Data

(62) Division of application No. 15/608,751, filed on May 30, 2017, now Pat. No. 10,609,975.

(51) Int. Cl.

| | |
|---|---|
| *B33Y 10/00* | (2015.01) |
| *A41G 5/02* | (2006.01) |
| *B33Y 50/00* | (2015.01) |
| *B33Y 80/00* | (2015.01) |
| *B33Y 30/00* | (2015.01) |
| *B29C 64/386* | (2017.01) |
| *B29C 64/106* | (2017.01) |
| *A45D 44/00* | (2006.01) |
| *G06T 7/00* | (2017.01) |

(Continued)

(52) U.S. Cl.
CPC .............. *B33Y 10/00* (2014.12); *A41G 5/02* (2013.01); *A45D 44/005* (2013.01); *B29C 64/106* (2017.08); *B29C 64/386* (2017.08); *B33Y 30/00* (2014.12); *B33Y 50/00* (2014.12); *B33Y 80/00* (2014.12); *G06T 7/0004* (2013.01); *A45D 2044/007* (2013.01); *B29L 2031/718* (2013.01); *B29L 2031/7532* (2013.01); *G06F 3/0482* (2013.01); *G06T 2207/10004* (2013.01); *G06T 2207/30108* (2013.01); *G06T 2207/30196* (2013.01)

(58) Field of Classification Search
None
See application file for complete search history.

(56) References Cited

U.S. PATENT DOCUMENTS

| | | |
|---|---|---|
| 7,773,091 B2 | 8/2010 | Giron et al. |
| 9,196,089 B2 | 11/2015 | Tena et al. |
| 2014/0135914 A1 | 5/2014 | Conant |

(Continued)

FOREIGN PATENT DOCUMENTS

| | | |
|---|---|---|
| FR | 2912620 A1 | 8/2008 |
| JP | 2006-79619 A | 3/2006 |

(Continued)

OTHER PUBLICATIONS

International Search Report and Written Opinion, dated Aug. 9, 2018, for International Patent Application No. PCT/US2018/033940. (12 pages).

(Continued)

*Primary Examiner* — Benjamin A Schiffman
(74) *Attorney, Agent, or Firm* — Christensen O'Connor Johnson Kindness PLLC

(57) ABSTRACT

Systems and methods for manufacturing eyelash prostheses are described.

17 Claims, 7 Drawing Sheets

(51) Int. Cl.
*B29L 31/00* (2006.01)
*G06F 3/0482* (2013.01)

(56) References Cited

U.S. PATENT DOCUMENTS

| | | |
|---|---|---|
| 2015/0366327 A1 | 12/2015 | LaHood, Sr. et al. |
| 2016/0067926 A1 | 3/2016 | Andrews |
| 2018/0168260 A1 | 6/2018 | Jacob |
| 2019/0269222 A1 | 9/2019 | Harding et al. |

FOREIGN PATENT DOCUMENTS

| | | | |
|---|---|---|---|
| KR | 10-2014-0099742 A | 8/2014 | |
| KR | 10-2016-0049195 A | 5/2016 | |

OTHER PUBLICATIONS

"Amazing Lash Studio," n.d., <https://www.amazinglashstudio.com/> [retrieved Aug. 31, 2017]. (3 pages).

"Perfect Corp. and Ardell Have Announced That They Will Feature Ardell's Best-Selling False Lashes in YouCam Makeup," Businesswire.com, Jan. 14, 2016, <http://www.businesswire.com/news/home/20160114005516/en"Look-La> [retrieved Aug. 31, 2017]. (4 pages).

"Product Try-On: What You're Wearing," Sephora Virtual Artist, © 2017 Sephora, <https://sephoravirtualartist.com/pto_5.0.php?country=US&lang=en&x=&s> [retrieved Aug. 31, 2017]. (1 page).

"Sephora Virtual Artist," © 2017 Sephora, <https://sephoravirtualartist.com/landing_5.0.php?country=US&lang=en&> [retrieved Aug. 31, 2017]. (1 page).

Second Office Action dated Sep. 14, 2020, in Chinese Patent Application No. 201880032435.0, 17 pages.

Korean Office Action dated Nov. 5, 2020, in Korean Patent Application No. 10-2019-7038327, 12 pages.

Feng, Jingwen, "Electrical Automation Engineering," Guangming Daily Press, pp. 188-191, Aug. 2016.

Japanese Notice of Reason for Refusal dated Dec. 1, 2020, in Japanese Patent Application No. 2019-555451, 4 pages.

Note of Reasons for Rejection dated Apr. 27, 2020, issued in Chinese Application No. 201880032435.0, filed May 22, 2018, 9 pages.

Notification of Reason for Refusal (Korean Office Action) dated May 27, 2021, in Korean Patent Application No. 10-2019-7038327, 13 pages.

METHODS FOR FABRICATING CUSTOM EYELASH PROSTHESES

CROSS-REFERENCE TO RELATED APPLICATION

The present application is a divisional of U.S. patent application Ser. No. 15/608,751, filed May 30, 2017, which is incorporated herein by reference.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the present disclosure provides a system generally including an additive manufacturing assembly; and a computing arrangement, operatively coupled to the additive manufacturing assembly, including circuitry configured to operate the additive manufacturing assembly to manufacture an eyelash prosthesis configured to physically couple with and conform to a portion of the body including an eyelid based on one or more inputs indicative of physical attributes of the portion of the body including the eyelid, and one or more inputs indicative of a user-specific prosthesis attribute.

In accordance with any of the embodiments disclosed herein, the system may further include an image sensor configured to create an image of the portion of a body; and circuitry configured to operate the image sensor to create an image of the portion of the body.

In accordance with any of the embodiments disclosed herein, the system may further include a client device interface including circuitry configured to detect a client device and to exchange user-specific prosthesis attribute information with the client device.

In accordance with any of the embodiments disclosed herein, the system may further include a user interface operatively coupled to the computing arrangement, wherein the user interface may be configured to receive one or more inputs indicative of a user-specific prosthesis attribute. In accordance with any of the embodiments disclosed herein, the user interface may include a menu including one or more user-specific prosthesis attributes selectable by a user. In accordance with any of the embodiments disclosed herein, the one or more user-specific prosthesis attributes may include attributes populated by crowdsourcing, previous printouts, and push-notice. In accordance with any of the embodiments disclosed herein, the user interface includes a display configured to display an image of the portion of a body and a superimposed image of the eyelash prosthesis design on the image of the portion of a body.

In another aspect, the present disclosure provides a method of making an eyelash prosthesis generally including determining one or more physical attributes of a portion of a body; and operating an additive manufacturing assembly according to an eyelash prosthesis design to fabricate the eyelash prosthesis configured to couple with and conform to the portion of a body. In accordance with any of the embodiments disclosed herein, operating the additive manufacturing assembly to manufacture an eyelash prosthesis configured to physically couple with and conform to a portion of the body including an eyelid may be based on one or more inputs indicative of physical attributes of the portion of the body including the eyelid, and one or more inputs indicative of a user-specific prosthesis attribute. In accordance with any of the embodiments disclosed herein, the method is performed using a system as disclosed herein.

In accordance with any of the embodiments disclosed herein, the one or more inputs indicative of a user-specific prosthesis attribute may be chosen from filament number, filament length, filament curvature, filament aspect ratio, filament grouping, filament diameter, filament tip shape, filament color, filament color gradient, and filament softness.

In accordance with any of the embodiments disclosed herein, the one or more inputs indicative of a user-specific prosthesis attribute may be chosen from base thickness, base color, and base color gradient.

In accordance with any of the embodiments disclosed herein, the computing arrangement may be configured to operate the additive manufacturing assembly to manufacture the eyelash prosthesis to include attributes not found in nature.

In accordance with any of the embodiments disclosed herein, the one or more inputs indicative of a user-specific prosthesis attribute may be chosen from a written message coupled to a plurality of filaments, a symbol coupled to a plurality of filaments, natural colors, unnatural colors, natural textures, unnatural textures, and luminescent materials.

In accordance with any of the embodiments disclosed herein, the system may be configured to apply an adhesive to a portion of the eyelash prosthesis configured to contact the portion of a body.

In accordance with any of the embodiments disclosed herein, the system may include a cutter configured to cut a portion of the eyelash prosthesis. In accordance with any of the embodiments disclosed herein, the computing assembly may be configured to operate the additive manufacturing assembly to manufacture bulk prosthesis material and operate the cutter to cut the bulk prosthesis material to provide an eyelash prosthesis configured to couple with and conform to the portion of the body.

In accordance with any of the embodiments disclosed herein, the system may include a second image sensor configured to create a second image of the portion of body, wherein the computing arrangement includes circuitry configured to determine a size and a shape of the portion of body based on the first image and the second image.

In accordance with any of the embodiments disclosed herein, the method may include creating an image of the portion of the body including the eyelid; and wherein determining one or more physical attributes of the portion of a body is based on the image. In accordance with any of the embodiments disclosed herein, the method may include displaying an image of the portion of a body and an image of the eyelash prosthesis design superimposed over the image of the portion of a body.

In accordance with any of the embodiments disclosed herein, a user can modify an attribute of the eyelash prosthesis design with a user interface.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
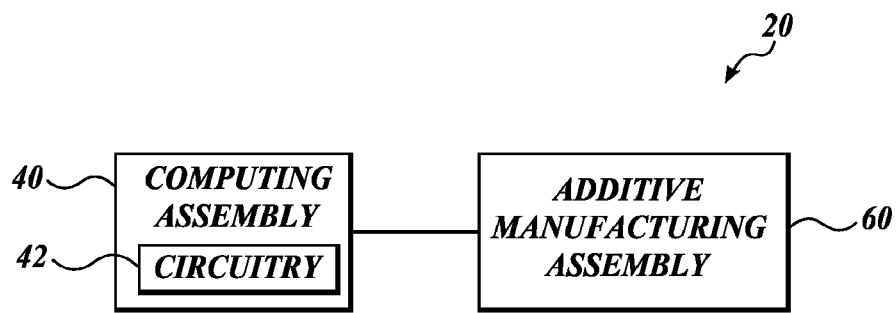
FIG. 1 schematically illustrates a representative embodiment of a system in accordance with the disclosure.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The present disclosure relates generally to systems and methods for manufacturing eyelash prostheses. Generally described, eyelash prostheses are used to enhance the length, fullness, and thickness of natural eyelashes. Such eyelash prostheses are typically applied to the eyelid with an adhesive.

Currently available eyelash prostheses are not customized to the body of a user. For example, current eyelash prosthesis may be too short or too long for the eyelid of a user. Furthermore, the eyelash prosthesis may have a curvature different from the eyelid of a user. Consequently, current eyelash prosthesis may not properly couple with and conform to a portion of the body including an eyelid, thereby causing discomfort to a user and/or inadequate adherence to the body of a user.

Furthermore, while there are currently many styles of eyelash prostheses available, a user is currently unable to custom design an eyelash prosthesis with attributes chosen by and specific to the user.

To that end, the following discussion provides examples of systems for and methods of manufacturing eyelash prostheses configured to physically couple with and conform to a portion of the body including an eyelid based on one or more inputs indicative of physical attributes of the portion of the body including the eyelid, and one or more inputs indicative of a user-specific prosthesis attribute. As will be described in more detail below, the systems include an additive manufacturing assembly and a computing arrangement, operatively coupled to the additive manufacturing assembly, including circuitry configured to operate the additive manufacturing assembly to manufacture the eyelash prosthesis. In that regard, the system allows a user to custom design an eyelash prosthesis to couple with an conform to a portion of their body that includes their eyelid or a body of another that includes an eyelid.

In the following description, numerous specific details are set forth in order to provide a thorough understanding of one or more embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

FIG. 1 schematically illustrates a representative system 20 according to an embodiment of the disclosure, which includes a computing assembly 40 and an additive manufacturing assembly 60 operatively coupled to the computing assembly 40. As will be described in more detail below, the computing assembly 40 includes circuitry 42 configured to operate the additive manufacturing assembly 60 to manufacture an eyelash prosthesis. Further, in an embodiment, the computing assembly 40 includes circuitry 42 configured to operate the additive manufacturing assembly 60 to manufacture an eyelash prosthesis configured to physically couple with and conform to a portion of the body including an eyelid based on one or more inputs indicative of physical attributes of the portion of the body including the eyelid, and one or more inputs indicative of a user-specific prosthesis attribute, as will be described further herein.

Additive manufacturing is a process used to create three-dimensional objects in which layers of material are formed under computer control. As used herein, an "additive manufacturing assembly" is an assembly configured to additively manufacture objects. In an embodiment, an additive manufacturing assembly includes an additive manufacturing assembly configured to perform additive manufacturing through stereolithography. In an embodiment, an additive manufacturing assembly includes an additive manufacturing assembly configured to perform additive manufacturing through fused deposition modeling.

Figure 2A:
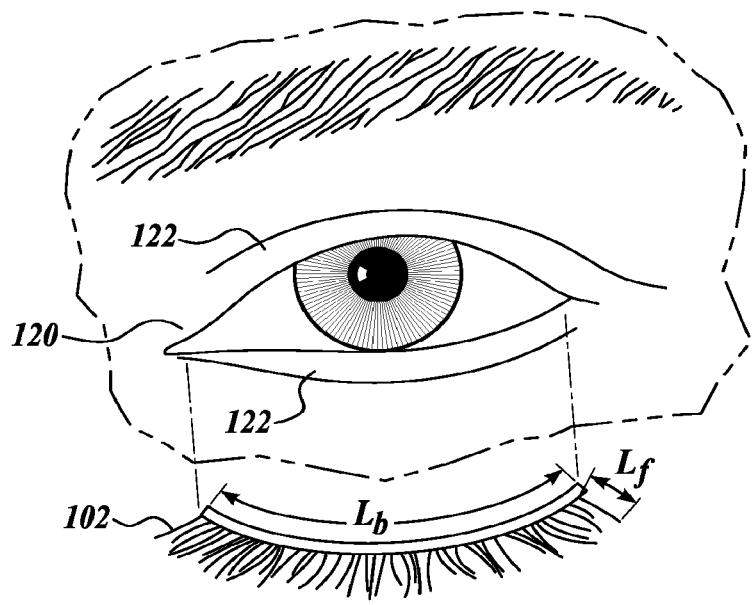
FIG. 2A is a side view of a representative embodiment of an eyelash prosthesis in accordance with the disclosure configured to couple with and conform to a portion of a body including an eyelid.

Turning to FIG. 2A, a representative eyelash prosthesis 100 is shown. As illustrated, the eyelash prosthesis 100 includes a base 104 to which a plurality of filaments 102 are coupled. The base 104 has a length $L_b$. In an embodiment, the length $L_b$ and curvature of the base 104 are such that the base 104 is configured to conform with and couple to a portion of the body 120 including an eyelid 122. The plurality of filaments 102 have lengths $L_f$ extending from the base 104 to their tips.

Figure 3:
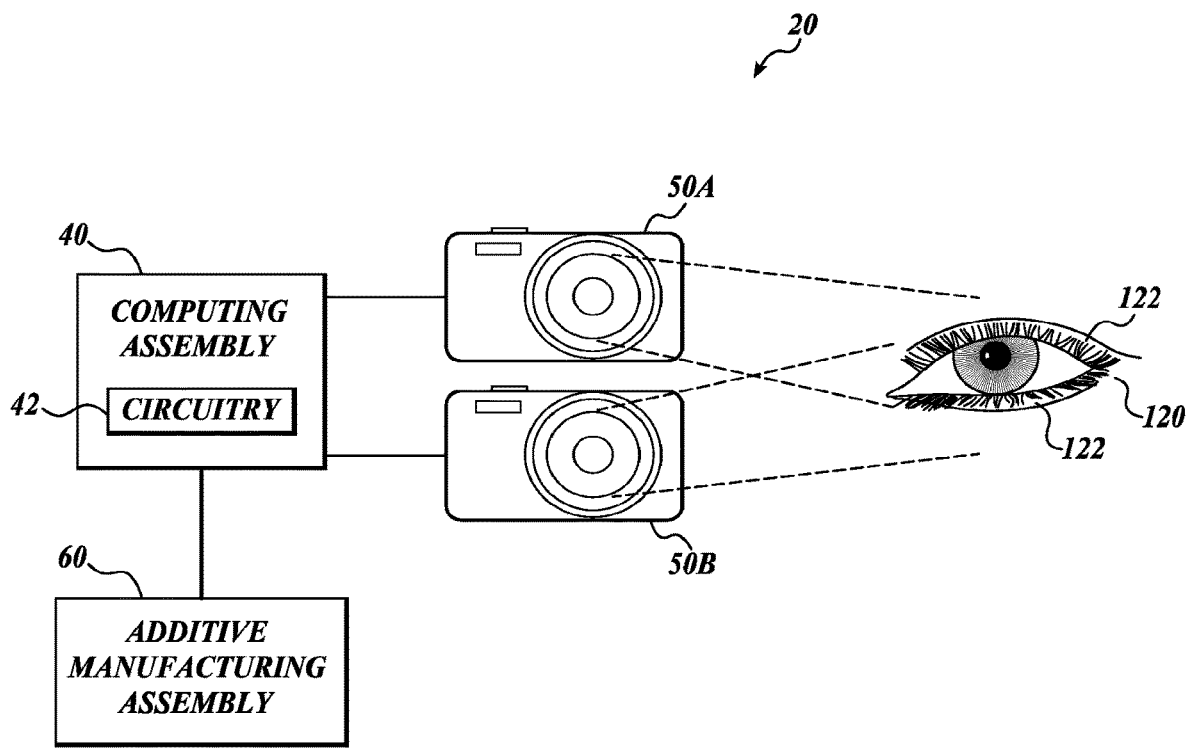
FIG. 3 schematically illustrates another representative embodiment of a system in accordance with the disclosure.

As above, the a computing arrangement includes circuitry configured to operate the additive manufacturing assembly based on one or more inputs indicative of physical attributes of the portion of the body including the eyelid. In an embodiment, physical attributes include eyelid length and eyelid curvature. In an embodiment, the system is configured to receive one or more inputs indicative of physical attributes of the portion of the body including the eyelid from one or more sensors. In an embodiment, the system 20 includes an image sensor 50, as illustrated in FIG. 3. In an embodiment, the system further comprises circuitry 42 configured to operate the image sensor 50 to create an image of the portion of the body 120 including an eyelid 122 for receipt by the computing arrangement 40. In an embodiment, the image sensor 50 is a camera.

Still referring to FIG. 3, in an embodiment, the system includes two image sensors 50A and 50B, each configured to create an image of the portion of the body 120 including an eyelid 122. In this regard, the system is configured to provide one or more inputs indicative of physical attributes of the portion of the body 120 including the eyelid 122. Specifically, by creating two images, one each from the two image sensors 50A and 50B, the computing arrangement 40 is configured to receive one or more inputs and to determine the shape and size of the portion of a body 120 including an eyelid 122 using parallax. Based on these inputs indicative of physical attributes of the portion of the body 120 including the eyelid 122, the a computing arrangement 40 including circuitry 42 is configured to operate the additive manufacturing 60 assembly to manufacture an eyelash prosthesis 100 configured to physically couple with and conform to a portion of the body 120 including an eyelid 122.

In an embodiment, the computing arrangement 40, operatively coupled to the additive manufacturing assembly 60, includes circuitry 42 configured to operate the additive manufacturing assembly 60 to manufacture an eyelash prosthesis 100 configured to physically couple with and conform to a portion of the body 100 including an eyelid 122 based on such one or more inputs indicative of a user-specific prosthesis attributes.

Figure 4:
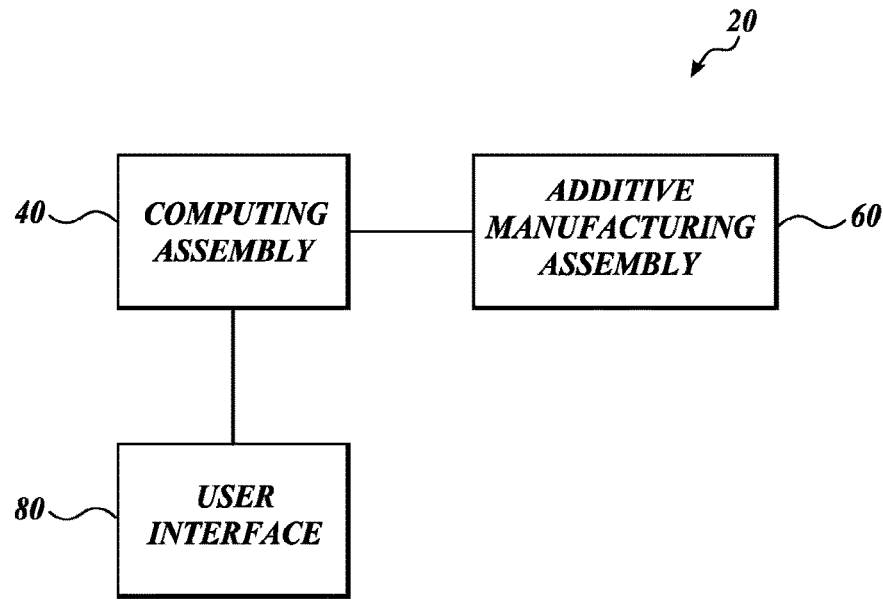
FIG. 4 schematically illustrates another representative embodiment of a system in accordance with the disclosure.

Turning to FIG. 4, in an embodiment the system includes a user interface 80 operatively coupled to the computing arrangement. In an embodiment, the user interface 80 is operatively coupled to the computing arrangement 40 and configured to provide the one or more inputs indicative of a user-specific prosthesis attribute for receipt by the computing arrangement 40.

As used herein, a "user-specific prosthesis attribute" refers to an attribute of a prosthesis chosen or otherwise selected by a user.

In an embodiment, the user interface is configured to receive one or more inputs indicative of a user-specific prosthesis attribute. In an embodiment, the user interface includes a touch screen configured to receive one or more inputs indicative of a user-specific prosthesis attribute. In an embodiment, the user interface includes push buttons configured to receive one or more inputs indicative of a user-specific prosthesis attribute. In an embodiment, the user interface includes a computer screen configured to receive one or more inputs indicative of a user-specific prosthesis attribute.

Figure 7:
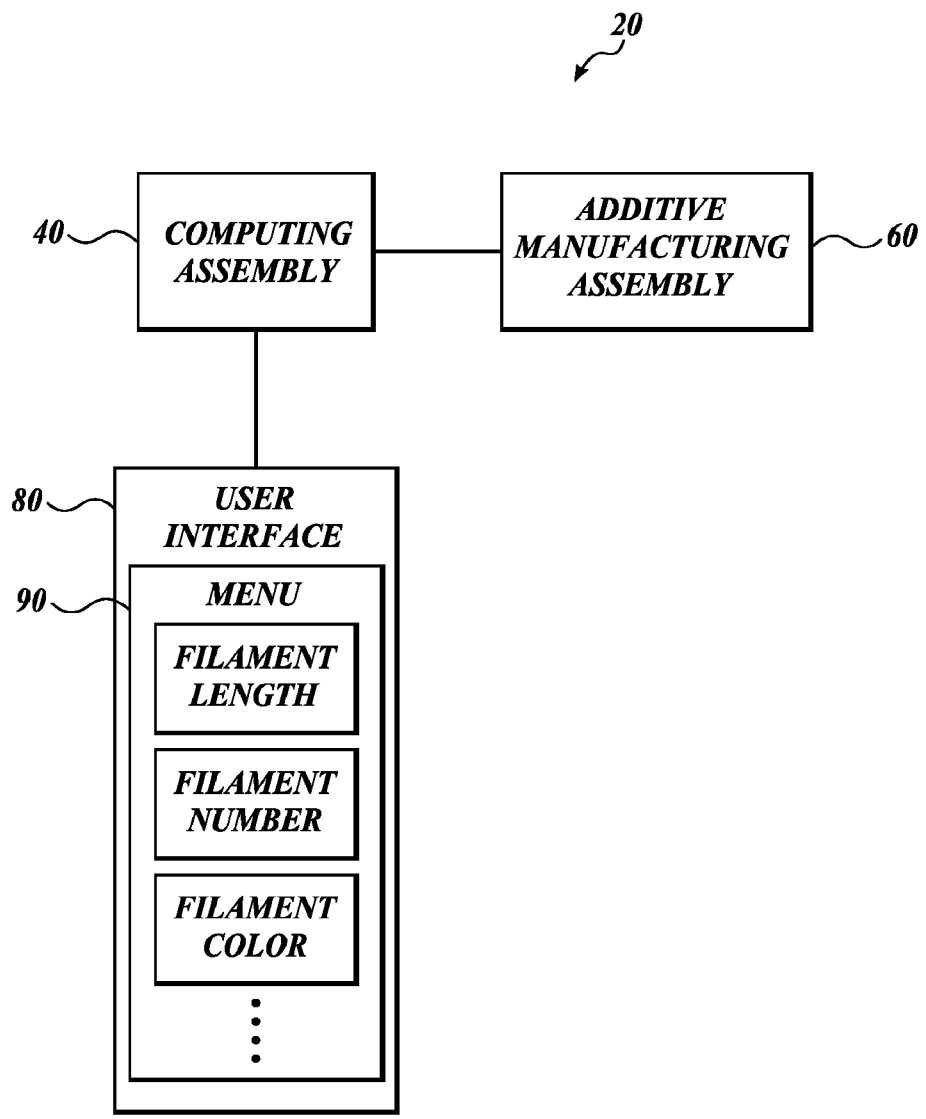
FIG. 7 schematically illustrates another representative embodiment of a system in accordance with the disclosure.

Turning to FIG. 7, in an embodiment, the system includes a user interface 80 including a menu 90 that includes one or more selectable user-specific prosthesis attributes. By selecting such one or more user-specific prosthesis attributes, a user can modify an eyelash prosthesis design. In this way, a user can customize an eyelash prosthesis design. In an embodiment, the one or more user-specific prosthesis attributes includes attributes populated by crowdsourcing, previous printouts, and push-notice items, such as an "eyelash of the day".

In an embodiment, the selectable user-specific prosthesis attributes include attributes of the eyelash prosthesis filaments. In an embodiment, the user-specific prosthesis attributes are chosen from filament number, filament length, filament curvature, filament aspect ratio, filament grouping, filament diameter, filament tip shape, filament color, filament color gradient, and filament softness.

In an embodiment, the selectable user-specific attributes include attributes of the eyelash prosthesis base. In an embodiment, the user-specific prosthesis attributes are chosen from base thickness, base color, and base color gradient.

In an embodiment, the user-specific prosthesis attributes include an eyelash prosthesis material. In an embodiment, the user-specific prosthesis attribute is a shape memory alloy. In an embodiment, the user-specific prosthesis attribute is a shape memory polymer.

In an embodiment, the user-specific prosthesis attributes include attributes, such as eyelash prosthesis textures, colors, shapes, lengths, and the like, that are not found in nature.

In an embodiment, the user-specific prosthesis attributes include attributes, such as eyelash prosthesis textures, colors, shapes, lengths, and the like, that are found in nature.

Figure 10:
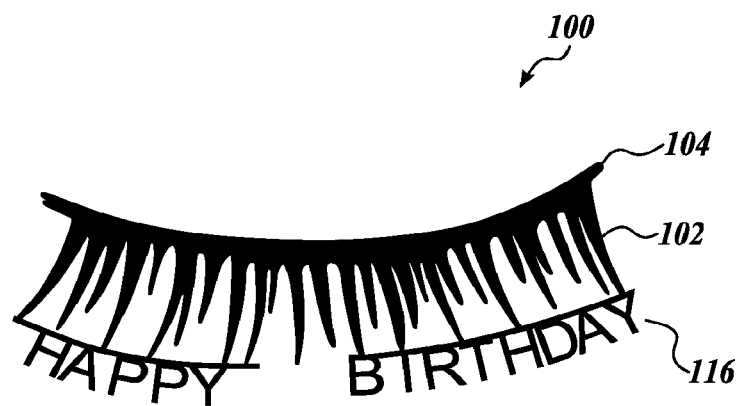
FIG. 10 is a side view of another representative embodiment of an eyelash prosthesis in accordance with the disclosure configured to couple with and conform to a portion of a body including an eyelid.

In an embodiment, the user-specific prosthesis attribute includes a written message or a symbol coupled to a plurality of filaments. Turning to FIG. 10, an eyelash prosthesis including a written message is illustrated. As shown, the eyelash prosthesis 100 includes a plurality of filaments 102 coupled to a base 104. A written message 116 is coupled to at least some of the plurality of filaments 102 opposite the base 104. Likewise, in an embodiment, the user-specific prosthesis attribute is a symbol (not shown) coupled to one or more filaments 102 opposite the base 104 of an eyelash prosthesis 100.

In an embodiment, the user-specific prosthesis attribute is an eyelash prosthesis including a luminescent material. In an embodiment, the luminescent material is chosen from florescent materials, black light-activated materials, electroluminescent materials, photo-luminescent materials, and the like. In an embodiment, the luminescent materials are embedded in or coupled to one or more of a plurality of filaments in the eyelash prosthesis.

Figure 11:
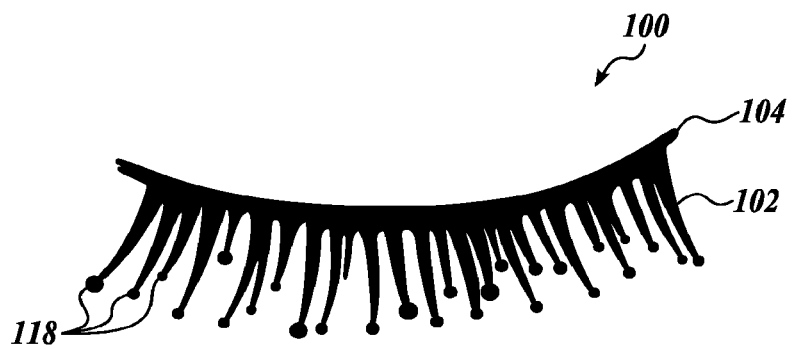
FIG. 11 is a side view of another representative embodiment of an eyelash prosthesis in accordance with the disclosure configured to couple with and conform to a portion of a body including an eyelid.

Turning to FIG. 11, an eyelash prosthesis 100 is shown that includes a base 104 and a plurality of filaments 102 attached thereto. Coupled to the ends of the plurality of filaments 102 opposite the base 104 are a plurality of luminescent materials 118. In an embodiment, the plurality of luminescent materials 118 includes one or more light-emitting diodes. In an embodiment, the plurality of light-emitting diodes is operatively coupled to a printed battery through a plurality of conductive traces. (Not shown.) In an embodiment, the user interface is hard wired to the computing arrangement.

Figure 5:
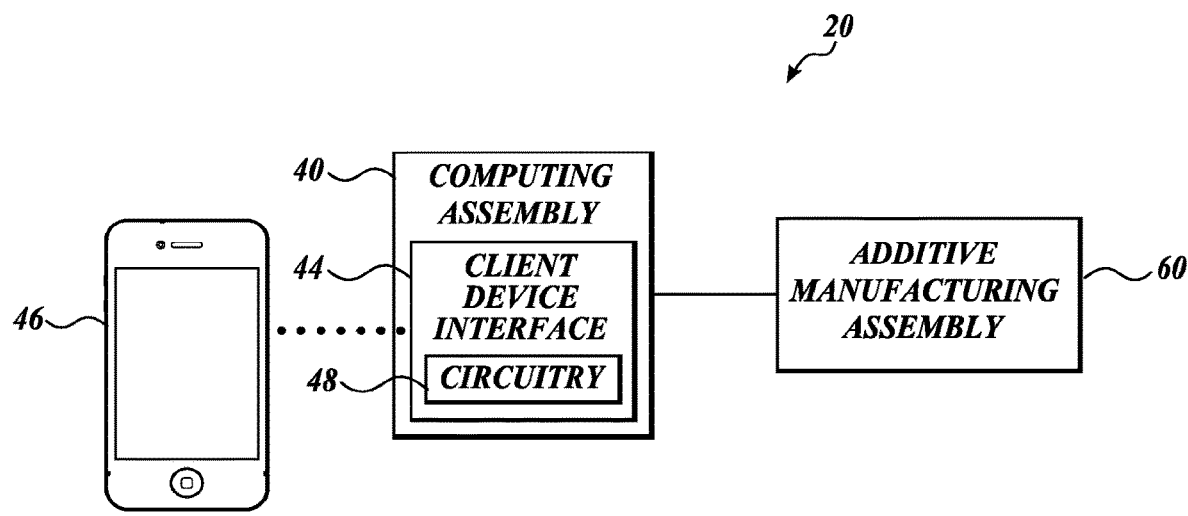
FIG. 5 schematically illustrates another representative embodiment of a system in accordance with the disclosure.

In another embodiment, the user interface is wirelessly coupled to the computing arrangement. In certain such embodiments, the user interface is carried by a client device. Turning to FIG. 5, in accordance with another embodiment, the system 20 includes a client device interface 44 including circuitry 48 configured to detect a client device 46 and to exchange user-specific prosthesis attribute information with the client device 46. In this regard, a user can operate a client device 46 to provide user-specific prosthesis attribute information to the system 20 and, thereby, modify an eyelash prosthesis design.

The client device 46 in one embodiment is a server, a tablet, a mobile phone, or a laptop computer. In one embodiment, the client device interface 44 includes circuitry 48 or modules configured to enable communication with the client device via a Personal Area Network (PAN), Local Area Network (LAN) or a Wide Area Network (WAN). Accordingly, the client device interface 44 is configured to communicate with a client device using standard wireless protocols (e.g., WiFi, WiMax, Bluetooth, ZigBee, Cellular, Infrared, Nearfield, etc.) or wired protocols (Universal Serial Bus or other serial communications such as RS-234, RJ-45, etc., parallel communications bus, etc.).

In one embodiment, the client device interface 44 includes circuitry 48 configured to initiate a discovery protocol that allows the client device 46 and the system to identify each other and exchange user-specific prosthesis attribute information. In one embodiment, the control information includes one or more control commands associated an eyelash prosthesis attribute.

Figure 6:
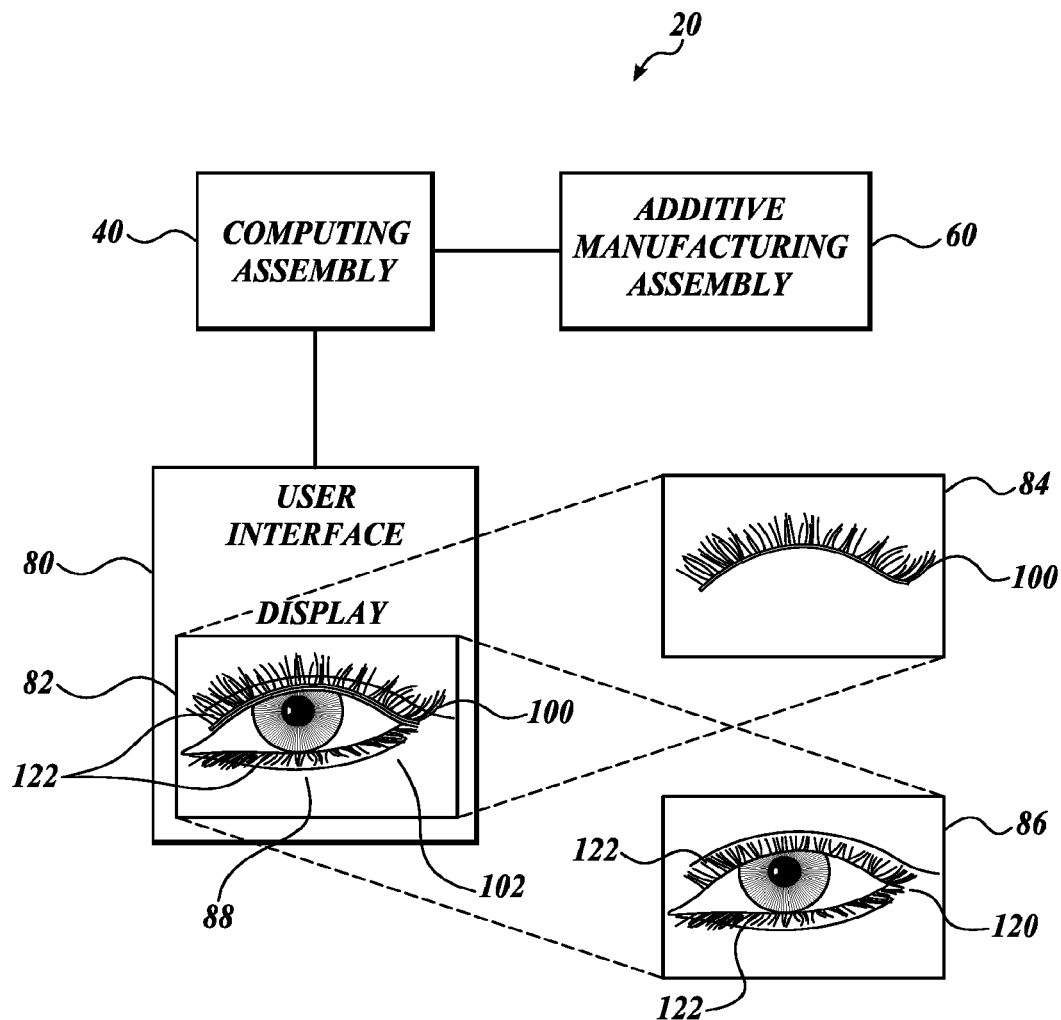
FIG. 6 schematically illustrates another representative embodiment of a system in accordance with the disclosure.

In an embodiment, the system includes a user interface operatively coupled to the computing arrangement, wherein the user interface is configured to receive one or more inputs indicative of a user-specific prosthesis attribute, and wherein the user interface comprises a display configured to display an image of the portion of a body and a superimposed image of the eyelash prosthesis design on the image of the portion of a body. In this regard, a user can superimpose an image of an eyelash prosthesis design on an image of the portion of the body to view the eyelash prosthesis as it would appear on the portion of the body. Turning to FIG. 6, a system 20 is illustrated, which includes a user interface 80 configured to display an image 86 of the portion of a body 120 and a superimposed image 84 of the eyelash prosthesis 100 design on the image of the portion of a body 120. As shown, the user interface 80 displays a composite image 88 that includes an image 86 of the portion of a body 120 and a superimposed image 84 of the eyelash prosthesis 100 design on the image of the portion of a body 120, such that the base 104 of the eyelash prosthesis 100 is placed in contact with an eyelid 122 as it would if the eyelash prosthesis 100 were coupled with and conformed to the eyelid 122.

In an embodiment, the user interface 80 is configured to is configured to receive one or more inputs indicative of a user-specific prosthesis attribute while the display 82 displays an image 86 of the portion of a body 120 and a superimposed image 84 of the eyelash prosthesis 100 design on the image 86 of the portion of a body 120. In this regard, a user can both view the eyelash prosthesis 100 as it would appear on the portion of the body 120 including an eyelid 122 and adjust the eyelash prosthesis 100 design at the same time.

Figure 2B:
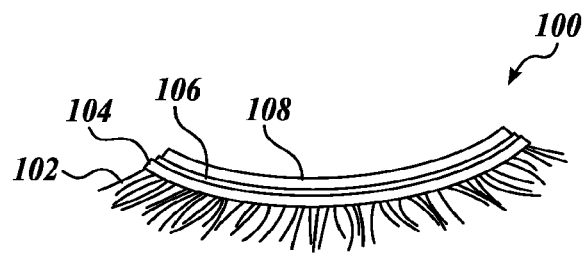
FIG. 2B is a side view of another representative embodiment of an eyelash prosthesis in accordance with the disclosure configured to couple with and conform to a portion of a body including an eyelid.

Frequently, eyelash prostheses are adhered to a portion of a body including an eyelash with an adhesive. In this regard, in an embodiment, the system is configured to apply an adhesive to a portion of the eyelash prosthesis configured to contact the portion of a body. Turning to FIG. 2B, an eyelash prosthesis including an adhesive is illustrated. The adhesive 106 is applied to the base 104 of the eyelash prosthesis, which is configured to couple with and conform to the portion of a body 120 including an eyelid 122.

In an embodiment, the system is configured to apply a release liner to the adhesive. Such release liners releasably couple with the adhesive and prevent the adhesive from adhering to a surface. In an embodiment, the release liner is a piece of wax paper configured to substantially cover and releasably couple to the adhesive. When a user is ready to adhere the eyelash prosthesis to a surface, the release liner is removed, thereby exposing the adhesive. Still referring to FIG. 2B, release liner 108 is coupled to adhesive 106, substantially covering the adhesive 106 and, thereby, preventing its adhesion to a surface.

In an embodiment, the computing arrangement includes circuitry configured to operate an additive manufacturing assembly to manufacture an eyelash prosthesis according an eyelash prosthesis design. In an embodiment, the system further comprises a cutter configured to cut a portion of the eyelash prosthesis, thereby completing or furthering the eyelash prosthesis design.

In an embodiment, the cutter includes one or more blades configured to cut a portion of an eyelash prosthesis. In an embodiment, the cutter includes one or more lasers configured to cut a portion of an eyelash prosthesis.

Figure 8:
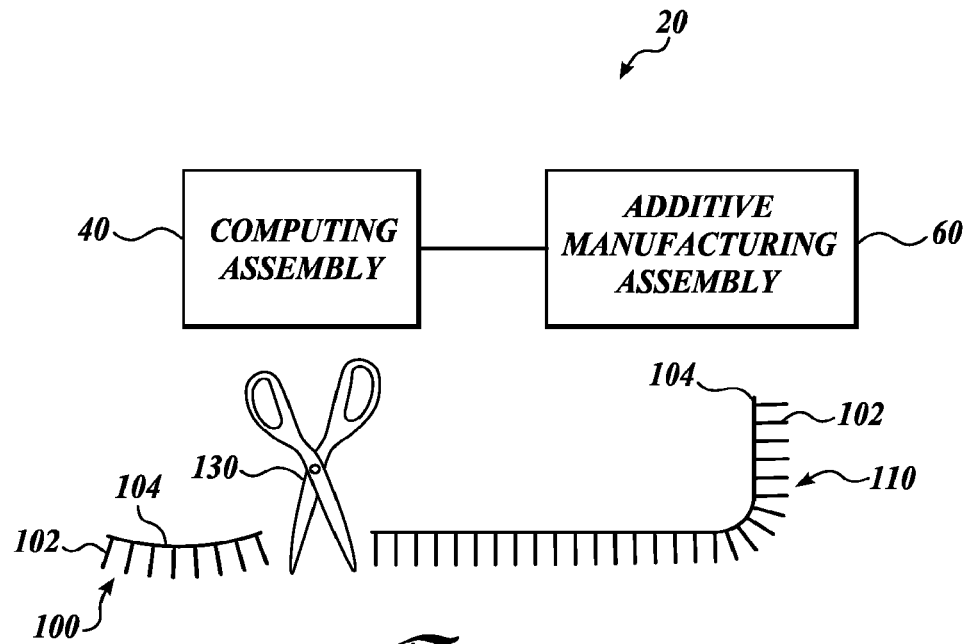
FIG. 8 schematically illustrates another representative embodiment of a system in accordance with the disclosure.

Turning to FIG. 8, a system comprising a computing assembly 40, an additive manufacturing assembly 60, and a cutter 130 is illustrated. In certain embodiments, the system is configured to operate the additive manufacturing assembly to manufacture an eyelash prosthesis and operate the cutter to cut portions of the eyelash prosthesis. In this regard, the system is configured to operate the additive manufacturing assembly 60 to produce, for example, bulk prosthesis material 110. The cutter 130 then cuts the bulk prosthesis material 110 in lengths configured to couple with and conform to a portion of the body 120 including an eyelid 122. In the illustrated example, the bulk eyelash prosthesis 110 is cut by the cutter 130 at a position on the base 104 to provide an eyelash prosthesis 100 including a base 104 of an appropriate length to couple with an conform to a portion of the body 120 including the eyelid 122.

Figure 9:
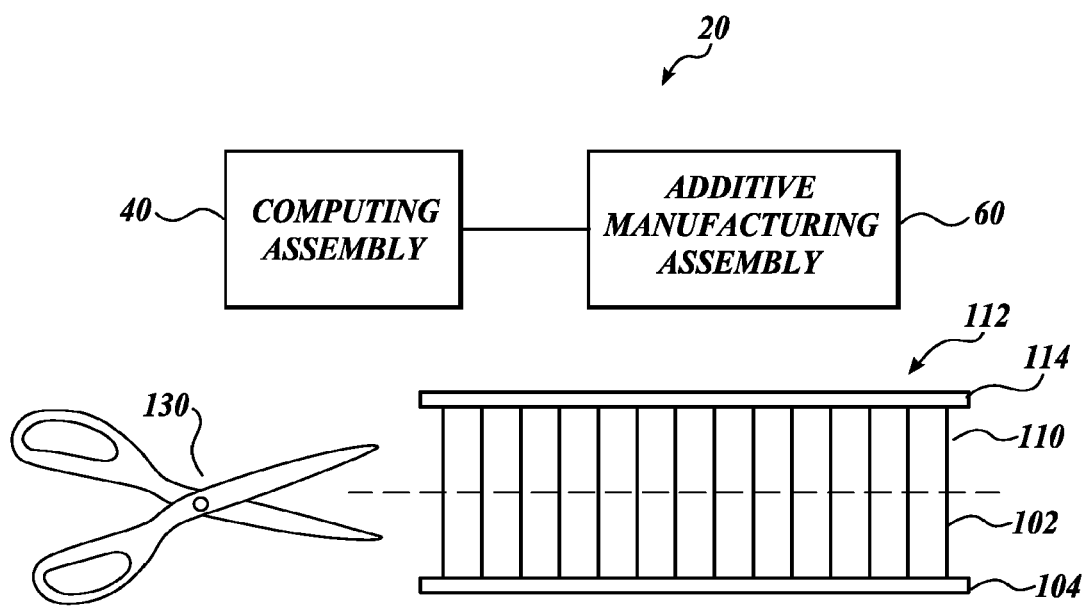
FIG. 9 schematically illustrates another representative embodiment of a system in accordance with the disclosure.

Certain methods of additive manufacturing initially provide two or more base members with filaments or smaller members bridging therebetween. Turning to FIG. 9, such a structure is illustrated. The manufactured structure 112 includes a first base member 114, a second base member 104, and a plurality of filaments 102 bridging therebetween. The cutter 130 is configured to cut the plurality of filaments 102 at a position between the base members 114 and 104 to provide an eyelash prosthesis 100 that includes the base 104 and the plurality of filaments 102 attached thereto.

In another aspect, the present disclosure provides a method of making an eyelash prosthesis. As discussed further herein, the disclosed embodiments can be used to make an eyelash prosthesis through additive manufacturing.

In an embodiment, the method of making an eyelash prosthesis is performed with a system comprising: an additive manufacturing assembly; and a computing arrangement, operatively coupled to the additive manufacturing assembly, including circuitry configured to operate the additive manufacturing assembly to manufacture an eyelash prosthesis configured to physically couple with and conform to a portion of the body including an eyelid based on one or more inputs indicative of physical attributes of the portion of the body including the eyelid, and one or more inputs indicative of a user-specific prosthesis attribute.

In an embodiment, a user modifies an attribute of an eyelash prosthesis design providing one or more inputs indicative of a user-specific prosthesis attribute with a user interface. In an embodiment, the user interface is part of a system, as described further herein. As described further herein, user interfaces operatively coupled to a computing arrangement and configured to receive one or more inputs indicative of a user-specific prosthesis attribute can be physically integrated into a system. In this regard, a user can provide one or more inputs indicative of a user-specific prosthesis attribute directly in a system, for example, into a system in a store where the eyelash prosthesis is printed.

In other embodiments, the user interface is physically separate from an additive manufacturing assembly. For example, a user can provide one or more inputs indicative of a user-specific prosthesis attribute into a client device, such as a cell phone or tablet, operably but wirelessly coupled to the computing assembly. In such embodiments, the user may be proximate to or physically remote from the additive manufacturing assembly. In this regard, a user can create an eyelash prosthesis design with a client device and obtain the eyelash prosthesis directly or have it, for example, mailed to the user or other end user.

In an embodiment, the method comprises displaying an image of a portion of a body including an eyelid and an image of the eyelash prosthesis design superimposed over the image of a portion of a body. As described further herein, in this regard a user can view the eyelash prosthesis as it would appear when worn. Further, in an embodiment a user can use the user interface to modify the eyelash prosthesis design as an image of the eyelash prosthesis design is superimposed on an image of the portion of the body including an eyelid.

In an embodiment, the method includes determining one or more physical attributes of a portion of a body including an eyelid; and operating an additive manufacturing assembly according to an eyelash prosthesis design to fabricate the eyelash prosthesis configured to couple with and conform to the portion of a body.

In an embodiment, determining one or more physical attributes of a portion of a body including an eyelid includes creating an image of the portion of a body including the eyelid; and wherein determining one or more physical attributes of the portion of a body is based on the image. In an embodiment, determining one or more physical attributes of the portion of a body includes creating two or more images of the portion of a body taken from different vantage points; and wherein determining one or more physical attributes of the portion of a body is based on the two or more images. As described further herein, in so doing a computing assembly including circuitry is configured to determine a size and a shape of the portion of a body based on the two or more images.

In an embodiment, operating the additive manufacturing assembly includes operating the additive manufacturing assembly includes operating the additive manufacturing assembly using a method chosen from stereolithography and fused deposition modeling.

While illustrative embodiments have been illustrated and described, it will be appreciated that various changes can be made therein without departing from the spirit and scope of the invention.

It should be noted that for purposes of this disclosure, terminology such as "upper," "lower," "vertical," "horizontal," "inwardly," "outwardly," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. The term "about" means plus or minus 5% of the stated value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method of making an eyelash prosthesis comprising:
   determining one or more physical attributes of a portion of a body including an eyelid; and
   operating an additive manufacturing assembly based on one or more inputs indicative of physical attributes of the portion of the body including the eyelid and according to an eyelash prosthesis design to fabricate the eyelash prosthesis configured to couple with and conform to the portion of the body including the eyelid.

2. The method of claim 1, further comprising creating an image of the portion of the body including the eyelid with an image sensor, wherein determining the one or more physical attributes of the portion of the body is based on the image.

3. The method of claim 2, wherein the image sensor is a first image sensor and the image is a first image, the method further comprising:
   creating a second image of the portion of the body with a second image sensor; and
   determining a size and a shape of the portion of the body based on the first image and the second image.

4. The method of claim 1, wherein determining the one or more physical attributes of the portion of the body includes generating size and shape information of the eyelid based on two or more images taken from different vantage points.

5. The method of claim 1, wherein operating the additive manufacturing assembly to manufacture the eyelash prosthesis includes operating the additive manufacturing assembly based one or more inputs indicative of a user-specific prosthesis attribute.

6. The method of claim 5, wherein the one or more inputs indicative of a user-specific prosthesis attribute are chosen from filament number, filament length, filament curvature, filament aspect ratio, filament grouping, filament diameter, filament tip shape, filament color, filament color gradient, and filament softness.

7. The method of claim 5, wherein the one or more inputs indicative of a user-specific prosthesis attribute are chosen from a written message coupled to a plurality of filaments, a symbol coupled to a plurality of filaments, natural colors, unnatural colors, natural textures, unnatural textures, and luminescent materials.

8. The method of claim 5, wherein the one or more inputs indicative of a user-specific prosthesis attribute are chosen from base thickness, base color, and base color gradient.

9. The method of claim 5, further comprising receiving, with a user interface, the one or more inputs indicative of a user-specific prosthesis attribute.

10. The method of claim 1, wherein a user modifies an attribute of the eyelash prosthesis design with a user interface.

11. The method of claim 1, further comprising:
    detecting a client device with a client device interface; and
    exchanging user-specific prosthesis attribute information with the client device.

12. The method of claim 1, further comprising cutting a portion of the fabricated eyelash prosthesis.

13. The method of claim 12, wherein operating the additive manufacturing assembly includes operating the additive manufacturing assembly to manufacture bulk prosthesis material and cutting the bulk prosthesis material to provide an eyelash prosthesis configured to couple with and conform to the portion of the body including the eyelid.

14. The method of claim 1, further comprising displaying an image of the portion of the body and an image of the eyelash prosthesis design superimposed over the image of the portion of the body.

15. The method of claim 1, wherein operating the additive manufacturing assembly includes operating the additive manufacturing assembly to manufacture the eyelash prosthesis to include attributes not found in nature.

16. The method of claim 1, wherein operating the additive manufacturing assembly includes operating the additive manufacturing assembly using a method chosen from stereolithography and fused deposition modeling.

17. The method of claim 1, further comprising applying an adhesive to a portion of the eyelash prosthesis configured to contact the portion of the body.

\* \* \* \* \*